(12) United States Patent
Chen et al.

(10) Patent No.: US 8,576,349 B2
(45) Date of Patent: Nov. 5, 2013

(54) LIQUID CRYSTAL DISPLAY PANEL AND LIQUID CRYSTAL DISPLAY ARRAY SUBSTRATE

(71) Applicant: AU Optronics Corporation, Hsin-Chu (TW)

(72) Inventors: I-Chun Chen, Hsin-Chu (TW); Chu-Yu Liu, Hsin-Chu (TW); Kuei-Sheng Tseng, Hsin-Chu (TW); Po-Jen Chiang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/875,372

(22) Filed: May 2, 2013

(65) Prior Publication Data

US 2013/0235291 A1    Sep. 12, 2013

Related U.S. Application Data

(62) Division of application No. 13/108,047, filed on May 16, 2011, now Pat. No. 8,462,284.

(30) Foreign Application Priority Data

Dec. 28, 2010    (TW) ............................... 99146392 A

(51) Int. Cl.
*G02F 1/136*    (2006.01)
(52) U.S. Cl.
USPC .................... 349/48; 349/37; 349/38; 349/39

(58) Field of Classification Search
USPC ................................................ 349/37–39, 48
See application file for complete search history.

(56) References Cited

U.S. PATENT DOCUMENTS

| | | | |
|---|---|---|---|
| 6,549,187 | B1 | 4/2003 | Matsubara et al. |
| 6,795,142 | B2 | 9/2004 | Chae et al. |
| 2005/0068477 | A1 | 3/2005 | Shin et al. |
| 2007/0126914 | A1 | 6/2007 | Komatsu et al. |
| 2007/0279566 | A1 | 12/2007 | Huang |
| 2009/0251627 | A1 | 10/2009 | Itsumi et al. |

FOREIGN PATENT DOCUMENTS

| | | |
|---|---|---|
| CN | 101650503 | 2/2010 |
| CN | 101750809 | 6/2010 |
| CN | 101916019 | 12/2010 |

*Primary Examiner* — Phu Vu
(74) *Attorney, Agent, or Firm* — WPAT, PC; Justin King

(57) ABSTRACT

A liquid crystal display panel and liquid crystal display array substrate are disclosed. The liquid crystal display array substrate includes first scan lines, second scan lines, data lines, first columns of pixel units and second columns of the pixel units. Each of the first columns of the pixel units has a plurality of first pixel structures electrically connected to the first scan lines and the data lines respectively. Each of the second columns of the pixel units has a plurality of second pixel structures electrically connected to the second scan lines and the data lines respectively. Each of the first pixel structures has a first storage capacitor, and the first storage capacitor has a first capacitance value. Each of the second pixel structures has a second storage capacitor, and the second storage capacitor has a second capacitance value, wherein the second capacitance value is less than the first capacitance value.

20 Claims, 15 Drawing Sheets

LIQUID CRYSTAL DISPLAY PANEL AND LIQUID CRYSTAL DISPLAY ARRAY SUBSTRATE

RELATED APPLICATIONS

This is a divisional application of patent application Ser. No. 13/108,047 filed on May 16, 2011, now allowed. The prior application Ser. No. 13/108,047 claims the benefit of Taiwan Patent Application No. 099146392 filed on Dec. 28, 2010, the disclosures of which are incorporated herein by reference in their entirety.

BACKGROUND

1. Technical Field

The present disclosure relates to display devices, and more particularly, liquid crystal display panels and liquid crystal display array substrates.

2. Description of Related Art

Liquid crystal displays (LCDs) are more energy efficient and offer safer disposal than cathode ray tube displays (CRTs). Its low electrical power consumption enables it to be used in battery-powered electronic equipment. It is an electronically modulated optical device made up of any number of pixels filled with liquid crystals and arrayed in front of a light source (backlight) or reflector to produce images in color or monochrome.

For LCDs, two dot horizontal inversion (2H inversion) driving is designed to circumvent the display flicker problem that results form a dot inversion under a dot mask. Significantly, a gate delay results in an undercharge for a high-resolution panel, so a gate must be turned on before the input of data. A large difference of charging state of pixels occurs due to whether polarity conversion is performed on data lines. Therefore, mesh lines or bright/dark lines may occur because of the undercharge.

In view of the foregoing, there is an urgent need in the related field to provide a way to solve or circumvent the problem of the mesh lines or the bright/dark lines.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to liquid crystal display panels and liquid crystal display array substrates.

According to one embodiment of the present invention, a liquid crystal display panel includes a first substrate, a second substrate, a liquid crystal layer, a plurality of scan lines, a plurality of data lines, a plurality of first rows of pixel units and a plurality of second rows of pixel units. The scan lines are disposed on the first substrate. The data lines are disposed on the first substrate and interlaced with the scan lines. The first rows of pixel units are parallel and disposed on the first substrate. Each of the first rows of the pixel units has a plurality of first pixel structures arranged in a row direction and electrically connected to the scan lines and the data lines respectively. Each of the first pixel structures has a first storage capacitor, and the first storage capacitor has a first capacitance value. The second rows of pixel units are parallel and disposed on the first substrate. The second rows of the pixel units and the first rows of the pixel units are arranged alternately. Each of the second rows of the pixel units has a plurality of second pixel structures arranged in the row direction and electrically connected to the scan lines and the data lines respectively. Each of the second pixel structures has a second storage capacitor, and the second storage capacitor has a second capacitance value, wherein the second capacitance value is less than the first capacitance value. The second substrate is disposed opposite to the first substrate. The liquid crystal layer is disposed between the first substrate and the second substrate.

According to a further embodiment of the present invention, a liquid crystal display array substrate includes a substrate, a plurality of scan lines, a plurality of data lines, a plurality of first rows of pixel units and a plurality of second rows of pixel units. The scan lines are disposed on the substrate. The data lines are disposed on the substrate and interlaced with the scan lines. The first rows of pixel units are parallel and disposed on the substrate. Each of the first rows of the pixel units has a plurality of first pixel structures arranged in a row direction and electrically connected to the scan lines and the data lines respectively. Each of the first pixel structures has a first storage capacitor, and the first storage capacitor has a first capacitance value. The second rows of pixel units are parallel and disposed on the substrate. The second rows of the pixel units and the first rows of the pixel units are arranged alternately. Each of the second rows of the pixel units has a plurality of second pixel structures arranged in the row direction and electrically connected to the scan lines and the data lines respectively. Each of the second pixel structures has a second storage capacitor, and the second storage capacitor has a second capacitance value, wherein the second capacitance value is less than the first capacitance value.

According to another embodiment of the present invention, a liquid crystal display panel includes a first substrate, a second substrate, a liquid crystal layer, a plurality of first scan lines, a plurality of second scan lines, a plurality of data lines, a plurality of first columns of pixel units and a plurality of second columns of pixel units. The first scan lines and the second scan lines are parallel and disposed on the first substrate alternately. The data lines are disposed on the first substrate and interlaced with the scan lines. The first columns of pixel units are parallel and disposed on the first substrate. Each of the first columns of the pixel units has a plurality of first pixel structures arranged in a column direction and electrically connected to the first scan lines and the data lines respectively. Each of the first pixel structures has a first storage capacitor, and the first storage capacitor has a first capacitance value. The second columns of pixel units being parallel and disposed on the first substrate. The second columns of the pixel units and the first columns of the pixel units are arranged alternately. Each of the second columns of the pixel units has a plurality of second pixel structures arranged in the column direction and electrically connected to the second scan lines and the data lines respectively. Each of the second pixel structures has a second storage capacitor, and the second storage capacitor has a second capacitance value. The second capacitance value is less than the first capacitance value. The second substrate is disposed opposite to the first substrate. The liquid crystal layer is disposed between the first substrate and the second substrate.

According to yet another embodiment of the present invention, a liquid crystal display array substrate includes a substrate, a plurality of first scan lines, a plurality of second scan lines, a plurality of data lines, a plurality of first columns of pixel units and a plurality of second columns of the pixel units. The first scan lines and the second scan lines are parallel and disposed on the substrate alternately. The data lines are disposed on the substrate and interlaced with the scan lines. The first columns of pixel units are parallel and disposed on the substrate. Each of the first columns of the pixel units has a plurality of first pixel structures arranged in a column direction and electrically connected to the first scan lines and the data lines respectively. Each of the first pixel structures has a first storage capacitor, and the first storage capacitor has a first capacitance value. The second columns of the pixel units are parallel and disposed on the substrate. The second columns of the pixel units and the first columns of the pixel units are arranged alternately. Each of the second columns of the pixel units has a plurality of second pixel structures arranged in the column direction and electrically connected to the second scan lines and the data lines respectively. Each of the second pixel structures has a second storage capacitor, and the second storage capacitor has a second capacitance value, wherein the second capacitance value is less than the first capacitance value.

According to still yet another embodiment of the present invention, a liquid crystal display panel includes a first substrate, a second substrate, a liquid crystal layer, a plurality of first scan lines, a plurality of second scan lines, a plurality of data lines, a plurality of first columns of the pixel units and a plurality of second columns of the pixel units. The first scan lines and the second scan lines are parallel and disposed on the first substrate alternately. The data lines are disposed on the first substrate and interlaced with the scan lines. The first columns of the pixel units are parallel and disposed on the first substrate. Each of the first columns of the pixel units has a plurality of first pixel structures arranged in a column direction and electrically connected to the second scan lines and the data lines respectively. Each of the first pixel structures has a first storage capacitor, and the first storage capacitor has a first capacitance value. The second columns of the pixel units are parallel and disposed on the first substrate. The second columns of the pixel units and the first columns of the pixel units are arranged alternately. Each of the second columns of the pixel units has a plurality of second pixel structures arranged in the column direction and electrically connected to the first scan lines and the data lines respectively. Each of the second pixel structures has a second storage capacitor, and the second storage capacitor has a second capacitance value. The second capacitance value is less than the first capacitance value. The second substrate is disposed opposite to the first substrate. The liquid crystal layer is disposed between the first substrate and the second substrate.

According to yet still another embodiment of the present invention, a liquid crystal display array substrate includes a substrate, a plurality of first scan lines, a plurality of second scan lines, a plurality of first columns of the pixel units and a plurality of second columns of the pixel units. The first scan lines and the second scan lines are parallel and disposed on the substrate alternately. The data lines are disposed on the substrate and interlaced with the scan lines. The first columns of the pixel units are parallel and disposed on the substrate. Each of the first columns of the pixel units has a plurality of first pixel structures arranged in a column direction and electrically connected to the second scan lines and the data lines respectively. Each of the first pixel structures has a first storage capacitor, and the first storage capacitor has a first capacitance value. The second columns of the pixel units are parallel and disposed on the substrate. The second columns of the pixel units and the first columns of the pixel units are arranged alternately. Each of the second columns of the pixel units has a plurality of second pixel structures arranged in the column direction to and electrically connected to the first scan lines and the data lines respectively. Each of the second pixel structures has a second storage capacitor, and the second storage capacitor has a second capacitance value, wherein the second capacitance value is less than the first capacitance value.

Technical advantages are generally achieved, by embodiments of the present invention, as follows:

1. The second capacitance value is less than the first capacitance value, so that holding voltages of two adjacent pixels are approximately or essentially equal after a feed-through voltage drop, thereby solving the problem of the mesh lines; and 2. The problem of the mesh lines or the bright/dark lines can be circumvented when the two holding voltages are approximately or essentially equal.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein:

FIG. 5 shows a display result when the pixel array of FIG. 4 is driven by the 2H inversion driving;

FIG. 9 shows a display result when the pixel array of FIG. 8 is driven by the 3H inversion driving;

FIG. 11 shows a display result of a 2V inversion when the pixel array of FIG. 10 is driven by the 2H inversion driving;

FIG. 13 shows a display result of a dot inversion when the pixel array of FIG. 12 is driven by the (2H+1) inversion driving.

DETAILED DESCRIPTION

Figure 1:
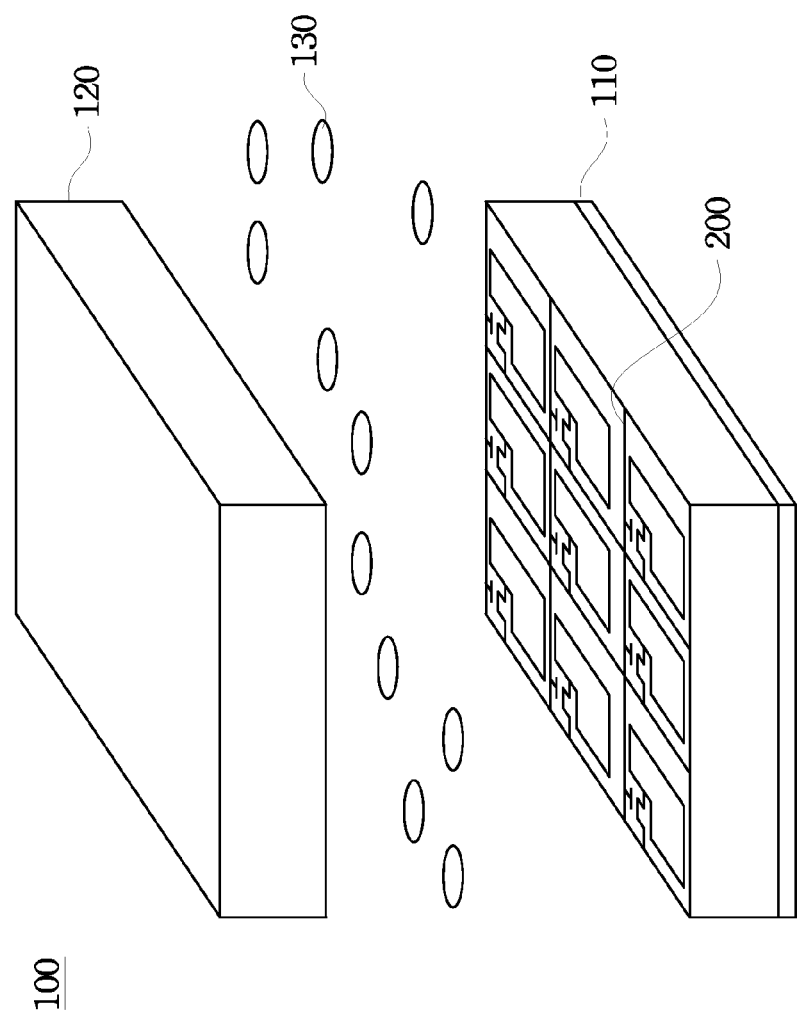
FIG. 1 is a schematic diagram of a liquid crystal display panel according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of a liquid crystal display panel 100 according to one embodiment of the present disclosure. As shown in FIG. 1, the liquid crystal display panel 100 includes a first substrate 110, a second substrate 120, a liquid crystal layer 130 and a pixel array 200.

The second substrate 120 is disposed opposite to the first substrate 110. The liquid crystal layer 130 is disposed between the first substrate 110 and the second substrate 120. The pixel array 200 is disposed on the first substrate 110.

For example, the first substrate 110 is a thin film transistor array substrate, and the second substrate 120 is a color filter substrate. Specifically, the second substrate 120 may include an upper base, a polarization plate, a color filter and common electrodes. For a more complete understanding of the pixel array 200 on the first substrate 110, herewith embodiments of the present invention are illustrated by reference to the following description considered in FIGS. 2-13.

Figure 2:
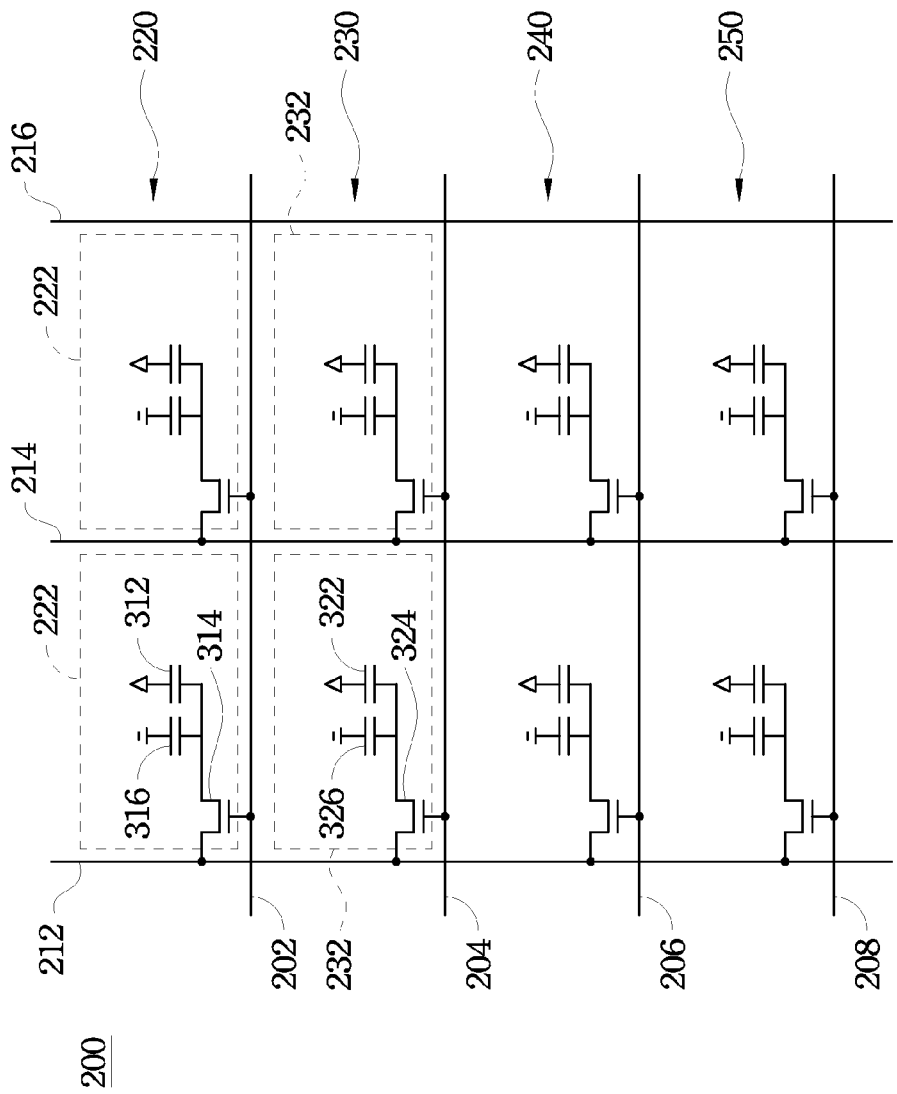
FIG. 2 is a partial circuit diagram of a pixel array of FIG. 1 according to one embodiment of the present disclosure.

FIG. 2 is a partial circuit diagram of the pixel array 200 according to one embodiment of the present disclosure. As shown in FIG. 2, the pixel array 200 includes scan lines 202-208, data lines 212-216, first rows of pixel units 220 and 240, and second rows of pixel units 230 and 250. These lines and units are disposed on the first substrate 110 of FIG. 1.

The data lines 212-216 are interlaced with the scan lines 202-208. The first rows of pixel units 220, and the second rows of pixel units 230 are parallel and disposed on the first substrate 110. The second rows of pixel units 230 and the first rows of pixel units 220 are arranged alternately.

Each of the first rows of the pixel units 220 has a plurality of first pixel structures 222 arranged in a row direction and electrically connected to the scan lines 202 and 206 and the data lines 212 and 214 respectively. Each of the first pixel structures 222 has a first storage capacitor 312, and the first storage capacitor 312 has a first capacitance value. Each of the second rows of the pixel units 230 has a plurality of second pixel structures 232 arranged in the row direction and electrically connected to the scan lines 204 and 208, and the data lines 212 and 214 respectively. Each of the second pixel structures 232 has a second storage capacitor 322, and the second storage capacitor 322 has a second capacitance value. The second capacitance value is less than the first capacitance value.

As to the structural difference between the first storage capacitor 312 and the second storage capacitor 322, for example, an area of the second storage capacitor 322 is smaller than an area of the first storage capacitor 312; alternatively, a thickness of the second storage capacitor 322 is greater than a thickness of the first storage capacitor 312; alternatively, a dielectric constant the second storage capacitor 322 is less than a dielectric constant of the first storage capacitor 312. Through any of above options, the second capacitance value is less than the first capacitance value. In this embodiment, the areas of the first and second storage capacitors are different.

In addition, each of the first pixel structures 222 includes a first thin film transistor 314. Each of the first thin film transistors 314 is connected to one of the scan lines 202 and 206, one of the data lines 212 and 214, and the first storage capacitor 312. Each of the second pixel structures 232 includes a second thin film transistor 324. Each of the second thin film transistors 324 is connected to one of the scan lines 204 and 208, one of the data lines 212 and 214, and the second storage capacitor 322.

Moreover, each of the first pixel structures 222 includes a first liquid crystal capacitor 316, and the first liquid crystal capacitor 316 is connected to the first thin film transistor 314; each of the second pixel structures 232 includes a second liquid crystal capacitor 326, and the second liquid crystal capacitor 326 is connected to the second thin film transistor 324. The other similar pixel to structures may be deduced by analogy as above embodiments and, thus, are not repeated herein.

Figure 3:
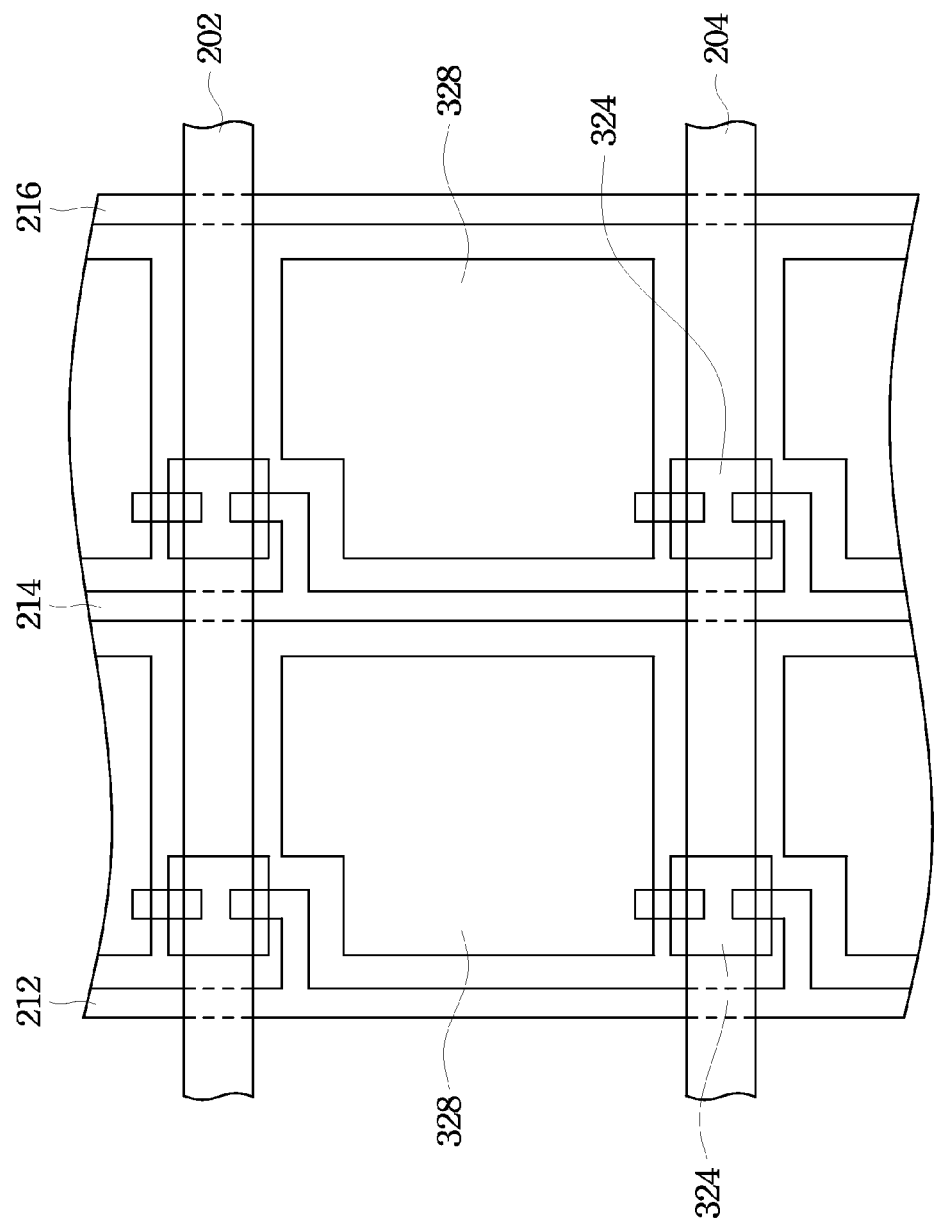
FIG. 3 is a layout drawing of two adjacent pixel structures of FIG. 2.

FIG. 3 is a layout drawing of two adjacent pixel structures 232 of FIG. 2. As shown in FIG. 3, the second thin film transistor 324 is connected to the pixel electrode 328, and the pixel electrode 328 can serves as one electrode plate of the second storage capacitor 322. Moreover, the first thin film transistor is also connected to the pixel electrode (not shown), and this pixel electrode can serves as one electrode plate of the first storage capacitor. In use, the polarity difference between two pixel electrodes 328 introduces fringe electric field, so that liquid crystal molecules of the liquid crystal layer 130 as shown in FIG. 1 may be rotated in an unwished direction.

Figure 4:
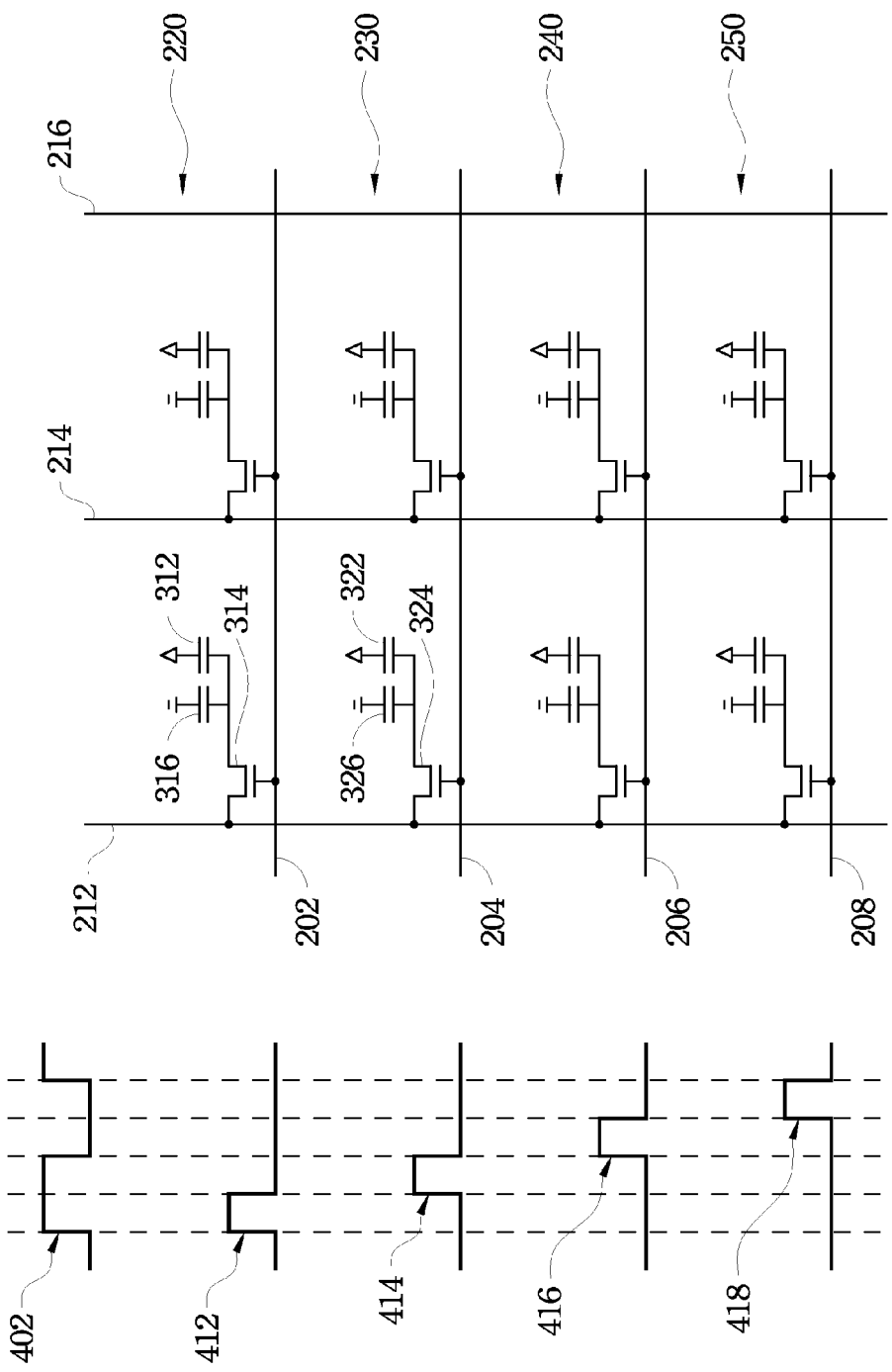
FIG. 4 illustrates the pixel array of FIG. 2 with 2H inversion driving.

FIG. 4 illustrates the pixel array 220 of FIG. 2 with two dot horizontal inversion (2H inversion) driving. In the 2H inversion driving, for example, a data driving circuit can provide a pixel data signal 402 for the data line 212. The pixel data signal 402 represents a gray level of R, G or B. During the pixel data signal 402 at a high level, a scan driving circuit can provide a scanning signal 412 for the scan line 202 to turn on the first thin film transistor 314, so that the first storage capacitor 312 can be charged. Then, the scan driving circuit can provide a scanning signal 414 for the scan line 204 to turn on the second thin film transistor 324, so that the second storage capacitor 322 can be charged. The scanning manner for other similar pixel structures may be deduced by analogy as above embodiments and, thus, are not repeated herein.

Moreover, a common voltage is provided for the common electrode, and the electrical field is generated between the common electrode and the pixel electrode, so that the liquid crystal molecules can rotate for rendering a specific to gray scale. During the pixel data signal 402 at a low level, the scan driving circuit can provide scanning signals 416 and 418 for the scan lines 206 and 208 respectively, but the corresponding first and second storage capacitor are not charged. The scanning manner for other similar pixel structures may be deduced by analogy as above embodiments and, thus, are not repeated herein.

Figure 5:
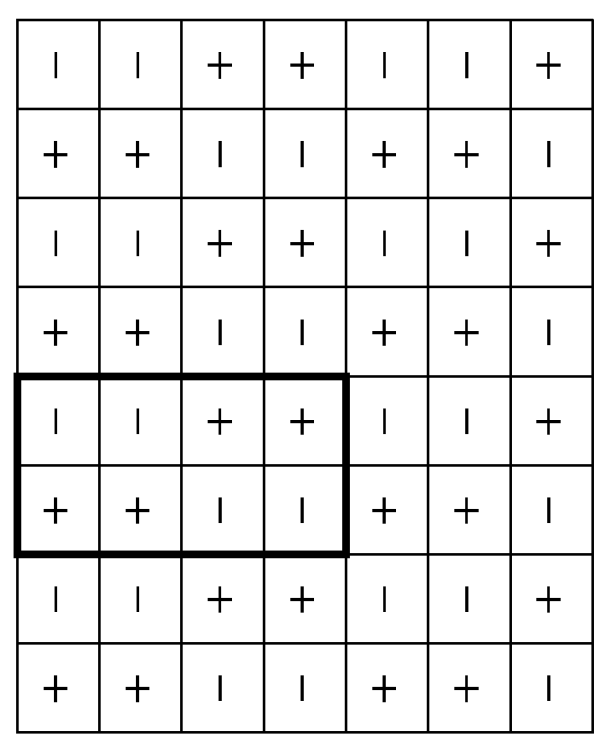

In general, the pixel data signal has either positive polarity or negative polarity depending on whether the voltage of the pixel data signal is higher or lower than the common voltage. A pixel data signal has positive polarity when its voltage level is higher than the common voltage. Likewise, a pixel data signal has negative polarity when its voltage is lower than the common voltage. FIG. 5 shows a display result when the pixel array 200 of FIG. 4 is driven by the 2H inversion driving. As shown in FIG. 5, "+" represents positive polarity, and "−" represents negative polarity. A portion of FIG. 5 indicated by the thick frame is corresponding to the pixel array of FIG. 4.

Figure 6A:
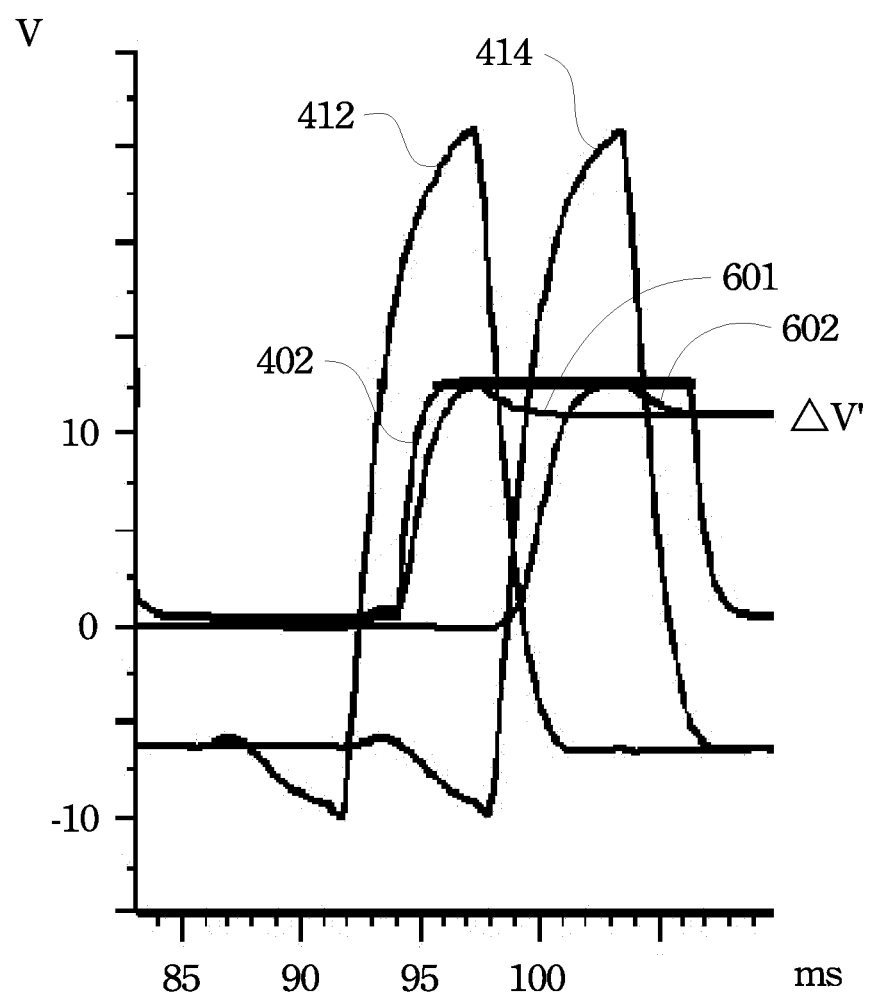
FIG. 6A a timing diagram illustrating the pixel array of FIG. 2 driven by the 2H inversion driving according to one embodiment of the present disclosure.

FIG. 6A a timing diagram illustrating the pixel array 200 of FIG. 2 driven by the 2H inversion driving at the level 0 of the grayscale according to one embodiment of the present disclosure. In FIG. 6A, twisted nematic liquid crystal is utilized for example. The second capacitance value (0.207 pico-Faraday (pF)) of the second storage capacitor 322 is less than the first capacitance value (0.247 pF) of the first storage capacitor 312. The pixel data signal 402 represents the level 0 of the grayscale. Because the scanning signal 412 is earlier than the pixel data signal 402, the pixel data signal 402 cannot transmitted to the first storage capacitor 312 when first thin film transistor 314 is turned on in the beginning. Therefore, the second capacitance value (0.207 pF) of the second storage capacitor 322 is less than the first capacitance value (0.247 pF) of the first storage capacitor 312, so that the holding voltage 601 of the first storage capacitor 312 is equal to the holding voltage 602 of the second storage capacitor 322 and is 11.055V, thereby solving the problem of the mesh lines.

Figure 6B:
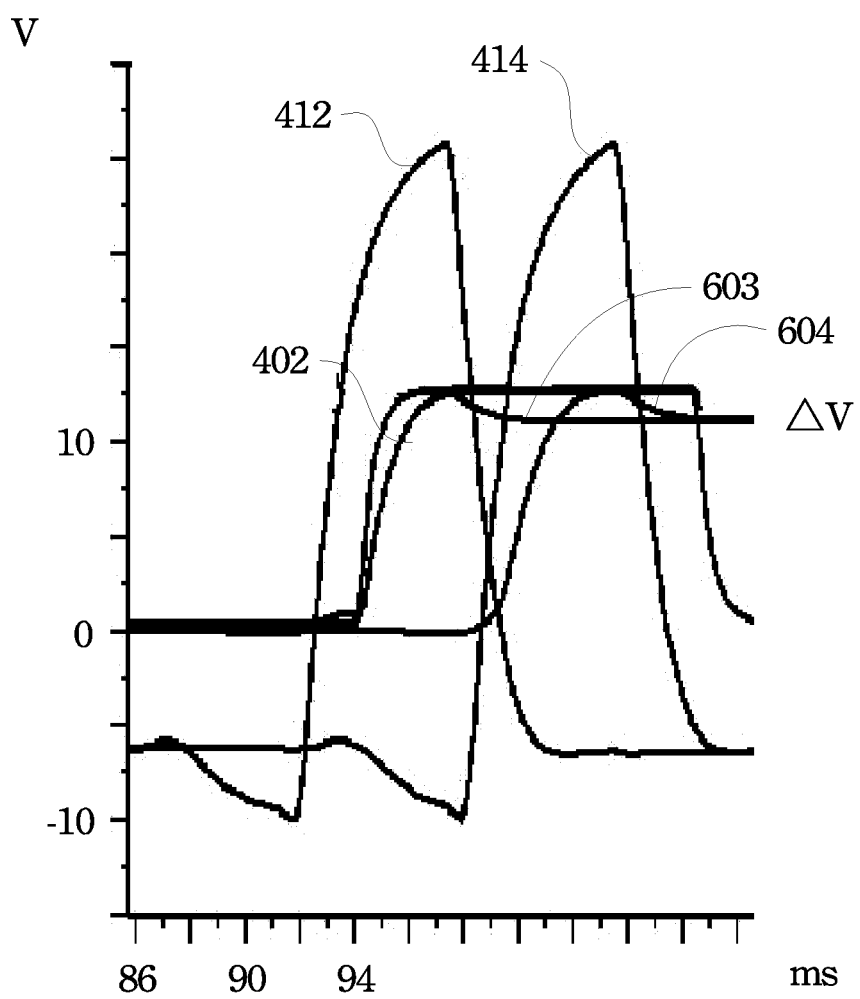
FIG. 6B a timing diagram illustrating a pixel array driven by the 2H inversion driving according to one control experiment.

FIG. 6B a timing diagram illustrating a pixel array driven by the 2H inversion driving at the level 0 of the grayscale according to one control experiment. The parameters and hardware architecture in the control experiment is essentially the same as those in the above embodiment of FIG. 6A, except that the second capacitance value (0.247 pF) of the second storage capacitor 322 is equal to the first capacitance value (0.247 pF) of the first storage capacitor 312. Because the first and second capacitance values are equal, the holding voltage 603 of the first storage capacitor 312 is 11.055V and the holding voltage 604 of the second storage capacitor 322 and is 11.153V. There is a large voltage difference ($\Delta V=0.098$ V) between the holding voltages 603 and 604, and thus the problem of the mesh lines occurs.

Figure 7A:
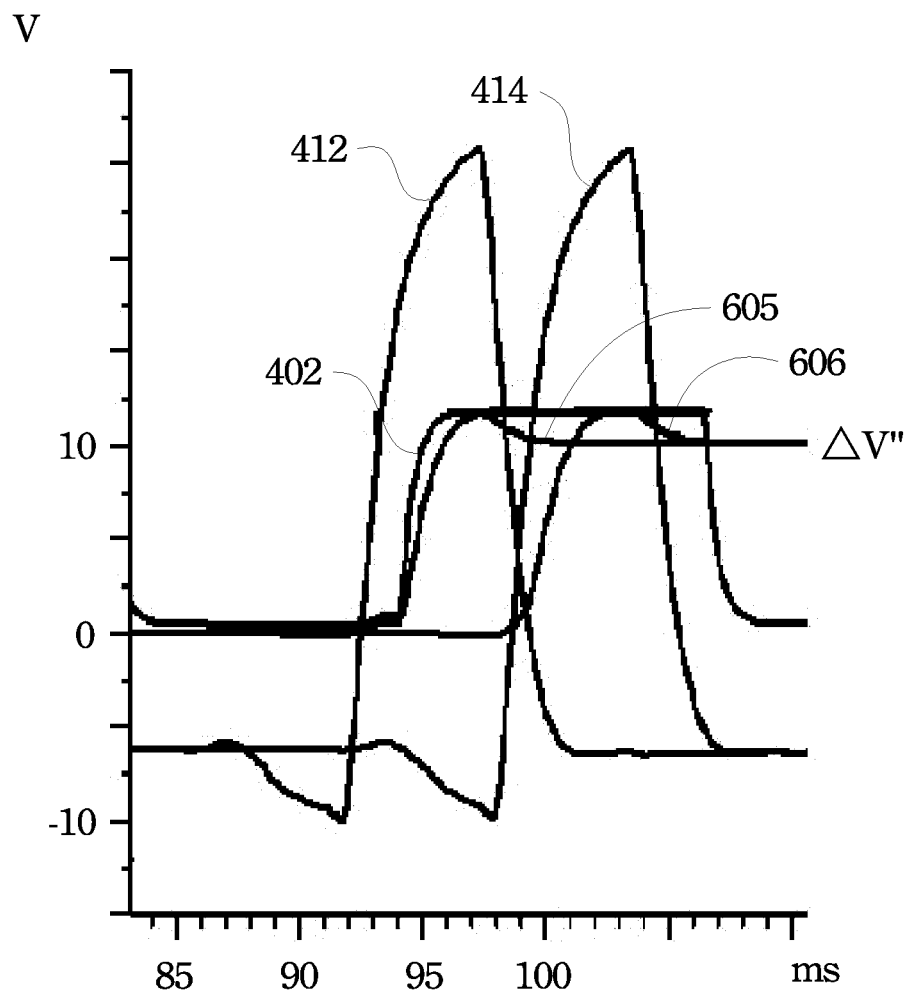
FIG. 7A a timing diagram illustrating the pixel array of FIG. 2 driven by the 2H inversion driving according to another embodiment of the present disclosure.

FIG. 7A a timing diagram illustrating the pixel array 200 of FIG. 2 driven by the 2H inversion driving at the level 32 of the grayscale according to one embodiment of the present disclosure. In FIG. 7A, the second capacitance value (0.207 pF) of the second storage capacitor 322 is less than the first capacitance value (0.247 pF) of the first storage capacitor 312. The pixel data signal 402 represents the level 32 of the grayscale. Because the scanning signal 412 is earlier than the pixel data signal 402, the pixel data signal 402 cannot transmitted to the first storage capacitor 312 when first thin film transistor 314 is turned on in the beginning. Therefore, the second to capacitance value (0.207 pF) of the second storage capacitor 322 is less than the first capacitance value (0.247 pF) of the first storage capacitor 312, so that the holding voltage 605 of the first storage capacitor 312 is 10.094V and the holding voltage 606 of the second storage capacitor 322 and is 10.127V. There is a small voltage difference ($\Delta V=0.033$ V) between the holding voltages 605 and 606, and thus the problem of the mesh lines is solved.

Figure 7B:
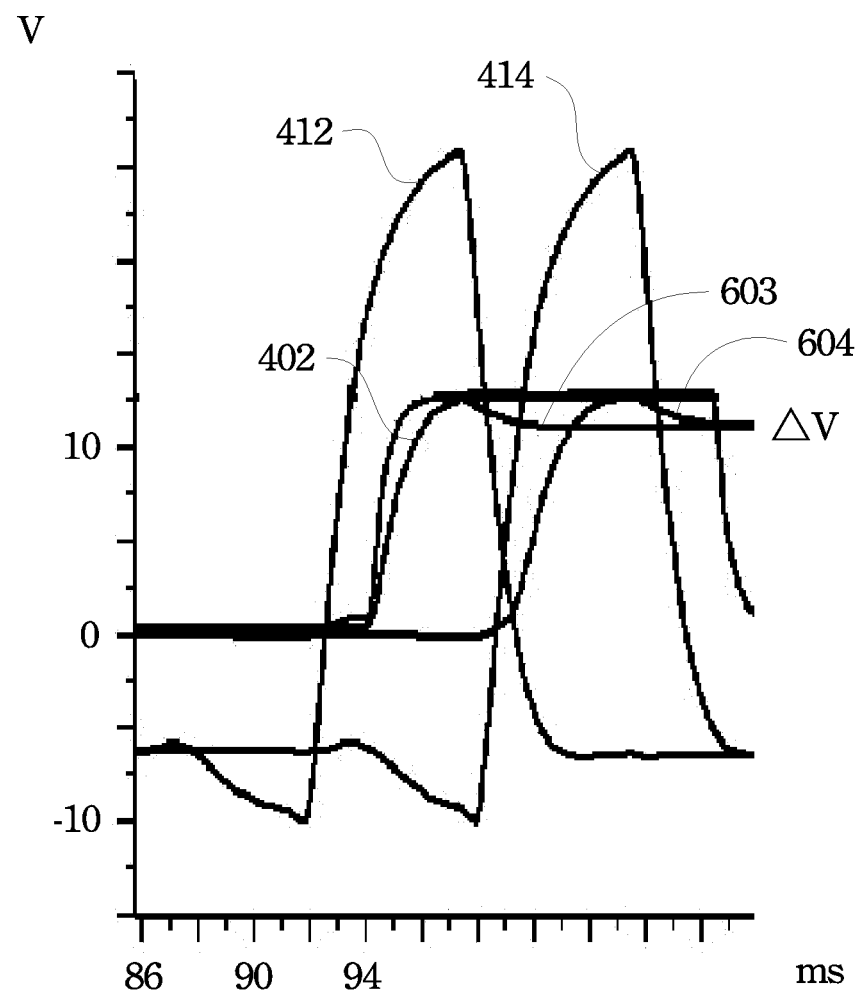
FIG. 7B a timing diagram illustrating a pixel array driven by the 2H inversion driving according to one control experiment.

FIG. 7B a timing diagram illustrating a pixel array driven by the 2H inversion driving at the level 32 of the grayscale according to one control experiment. The parameters and hardware architecture in the control experiment is essentially the same as those in the above embodiment of FIG. 7A, except that the second capacitance value (0.247 pF) of the second storage capacitor 322 is equal to the first capacitance value (0.247 pF) of the first storage capacitor 312 and the pixel data signal 402 represents the level 32 of the grayscale. Because the first and second capacitance values are equal, there is a large voltage difference ($\Delta V=0.098$ V) between the holding voltage 607 of the first storage capacitor 312 and the holding voltage 608 of the second storage capacitor 322, and thus the problem of the mesh lines occurs.

In practice, the second capacitance value of the second storage capacitor 322 is less than the first capacitance value of the first storage capacitor 312, so that the problem of the mesh lines is reduced. Preferably, the second capacitance value is in a range of 30-99.9 percentage of the first capacitance value, so that users generally cannot detect the mesh lines. More preferably, the second capacitance value is in a range of 50-95 percentage of the first capacitance value, so that the users it is hard for users to find out the mesh lines. Most preferably, the second capacitance value is in a range of 70-90 percentage of the first capacitance value, so as to eliminate the mesh lines effectively.

In view of above, the substrate 110 is combined with the pixel array 200 to serve as a liquid crystal display array substrate. The liquid crystal display array substrate includes a substrate 110, a plurality of scan lines 202-208, a plurality of data lines 212-216, a plurality of first rows of pixel units 220 and a plurality of second rows of pixel units 230. The scan lines 202-208 are disposed on the substrate 110. The data lines 212-216 are disposed on the substrate 110 and interlaced with the scan lines 202-208. The first rows of pixel units 220 are parallel and disposed on the substrate 110, wherein each of the first rows of the pixel units 220 has a plurality of first pixel structures 222 arranged in a row direction and electrically connected to the scan lines 202 and 206 and the data lines 212 and 214 respectively, wherein each of the first pixel structures 222 has a first storage capacitor 312, and the first storage capacitor 312 has a first capacitance value. The second rows of pixel units 230 are parallel and disposed on the substrate 110, wherein the second rows of the pixel units 230 and the first rows of the pixel units 220 are arranged alternately, wherein each of the second rows of the pixel units 230 has a plurality of second pixel structures 232 arranged in the row direction and electrically connected to the scan lines 204 and 208 and the data lines 212 and 214 respectively, wherein each of the second pixel structures 232 has a second storage capacitor 322, and the second storage capacitor 322 has a second capacitance value, wherein the second capacitance value is less than the first capacitance value.

Figure 8:
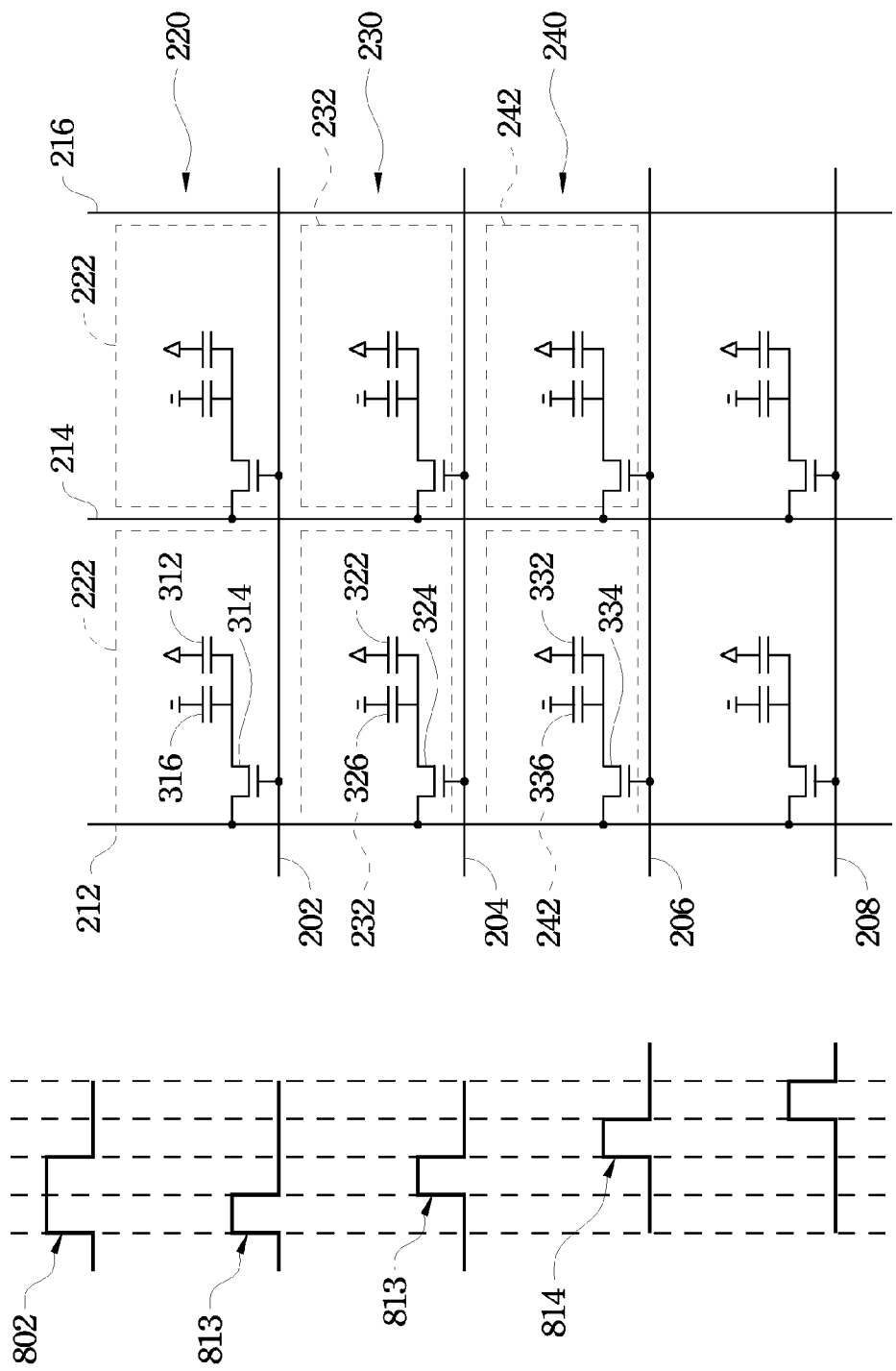
FIG. 8 illustrates the pixel array of FIG. 1 with 3H inversion driving according to a further embodiment of the present disclosure.

FIG. 8 illustrates the pixel array of FIG. 1 with 3H inversion driving according to a further embodiment of the present disclosure. The pixel array 200 of FIG. 8 is essentially the same as the pixel array 200 of FIG. 2, except that the row of the pixel units 240 acts as a third row of the pixel units 240 in FIG. 8. The third row of the pixel units 240 may be one or more third rows of the pixel units 240. The third rows of pixel units 240 are parallel and disposed on the first substrate 110, wherein each of the third rows of the pixel units 240 are disposed between an adjacent one of the second rows of the pixel units 230 and an adjacent one of the first rows of the pixel units 220, wherein each of the third rows of the pixel units 240 has a plurality of third pixel structures 242 arranged in the row direction and electrically connected to the scan line 206 and the data lines respectively, wherein each of the third pixel structure has a third storage capacitor 332, and the third storage capacitor 332 has a third capacitance value, wherein the third capacitance value is equal to the second capacitance value.

In addition, each of the third pixel structure 242 includes a third thin film transistor 324. Each of the third thin film transistors 324 is connected to the scan line 206, one of the data lines 212 and 214, and the third storage capacitor 332.

Moreover, each of the third pixel structures 242 includes a third liquid crystal capacitor 336, and the third liquid crystal capacitor 336 is connected to the third thin film transistor 334.

Figure 9:
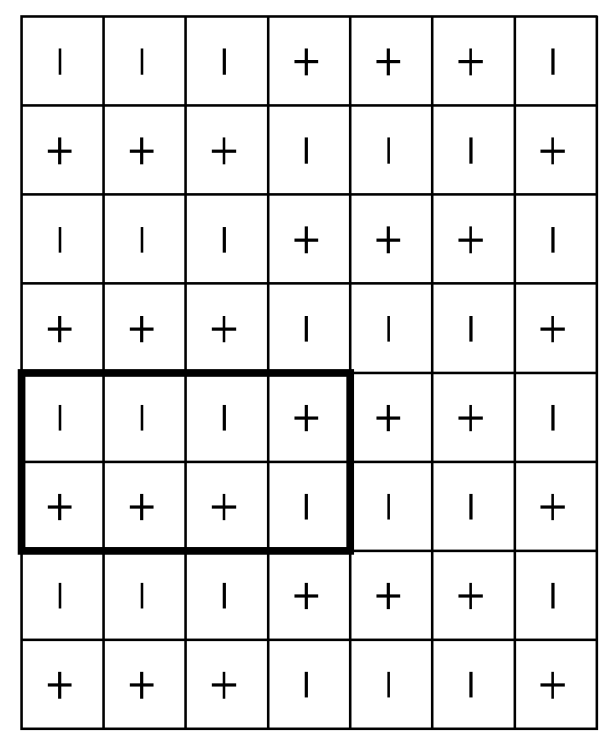

In the 3H inversion driving, for example, a data driving circuit can provide a pixel data signal 802 for the data line 212. The pixel data signal 802 represents a gray level of R, G or B. During the pixel data signal 802 at a high level, a scan driving circuit can provide a scanning signal 812 for the scan line 202 to turn on the first thin film transistor 314, so that the first storage capacitor 312 can be charged. Next, the scan driving circuit can provide a scanning signal 813 for the scan line 203 to turn on the second thin film transistor 324, so that the second storage capacitor 322 can be charged. Then, the scan driving circuit can provide a scanning signal 814 for the scan line 204 to turn on the third thin film transistor 334, so that the third storage capacitor 332 can be charged. The scanning manner for other similar pixel structures may be deduced by analogy as above embodiments and, thus, are not repeated herein. FIG. 9 shows a display result when the pixel array of FIG. 8 is driven by the three dot horizontal inversion (3H inversion) driving. A portion of FIG. 9 encircled by the thick frame corresponds to the pixel array of FIG. 8. The present invention can be applied to nH inversion driving likewise, where n is a positive integer.

Figure 10:
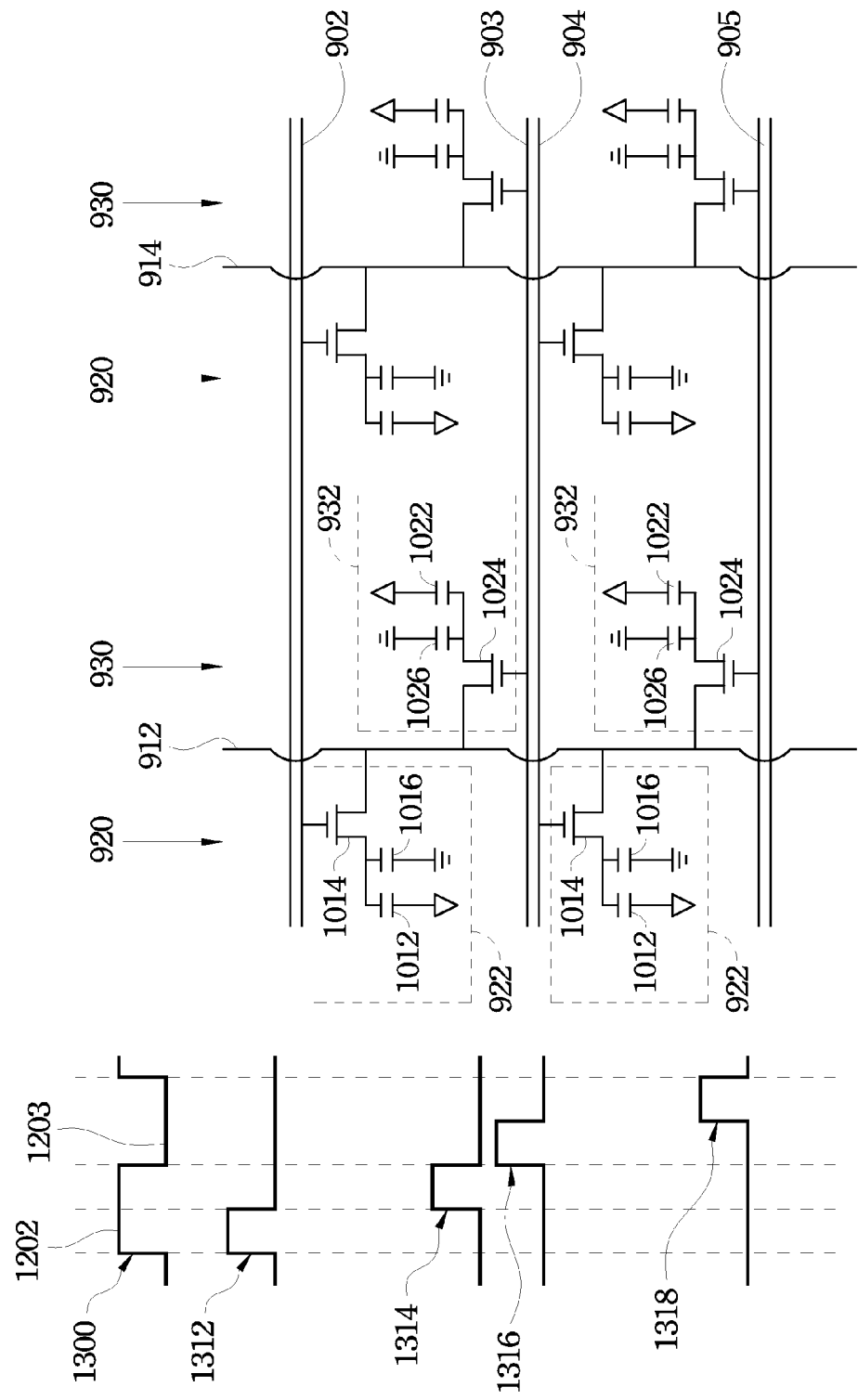
FIG. 10 is a partial circuit diagram of a pixel array of FIG. 1 with the 2H inversion driving according to another embodiment of the present disclosure.

FIG. 10 is a partial circuit diagram of a pixel array 200 of FIG. 1 with the 2H inversion driving according to another embodiment of the present disclosure. In FIG. 10, the pixel array 200 is arranged as a 2G1D structure, i.e. two gate lines-one data line structure. The pixel array 200 includes a plurality of first scan lines 902 and 904, a plurality of second scan lines 903 and 905, a plurality of data lines 912 and 914, a plurality of first columns of pixel units 920 and a plurality of second columns of the pixel units 930. These lines and units are disposed on the first substrate 110 of FIG. 1.

The first scan lines 902 and 904 and the second scan lines 903 and 905 are parallel and disposed on the substrate 110 alternately. The data lines 912 and 914 are disposed on the substrate 110 and interlaced with the scan lines 902-905. The first columns of pixel units 920 are parallel and disposed on the substrate 110; the second columns of the pixel units 930 are parallel and disposed on the substrate 110. The second columns of the pixel units 930 and the first columns of the pixel units 920 are arranged alternately.

Each of the first columns of the pixel units 920 has a plurality of first pixel structures 922 arranged in a column direction and electrically connected to the first scan lines 902 and 904 and the data line 912 respectively, wherein each of the first pixel structures 922 has a first storage capacitor 1012, and the first storage capacitor 1012 has a first capacitance value. Each of the second columns of the pixel units 930 has a plurality of second pixel structures 932 arranged in the column direction and electrically connected to the second scan lines 903 and 905 and the data line 912 respectively, wherein each of the second pixel structures 932 has a second storage capacitor 1022, and the second storage capacitor 1022 has a second capacitance value, wherein the second capacitance value is less than the first capacitance value.

As to the structural difference between the first storage capacitor 1012 and the second storage capacitor 1022, for example, an area of the second storage capacitor 1022 is smaller than an area of the first storage capacitor 1012; alternatively, a thickness of the second storage capacitor 1022 is greater than a thickness of the first storage capacitor 1012; alternatively, a dielectric constant the second storage capacitor 1022 is less than a dielectric constant of the first storage capacitor 1012. Through any of above options, the second capacitance value is less than the first capacitance value.

In addition, each of the first pixel structures 922 includes a first thin film transistor 1014. The first thin film transistor 1014 is connected to the first scan line 902 or 904, the data line 912 and the first storage capacitor 1012. Each of the second pixel structures 932 includes a second thin film transistor 1024. The second thin film transistor 1024 is connected to the second scan line 903 or 905, the data line 912 and the second storage capacitor 1022.

Moreover, each of the first pixel structures 922 includes a first liquid crystal capacitor 1016, and the first liquid crystal capacitor 1016 is connected to the first thin film transistor 1014; each of the second pixel structures 932 includes a second liquid crystal capacitor 1026, and the second liquid crystal capacitor 1026 is connected to the second thin film transistor 1024.

Figure 11:
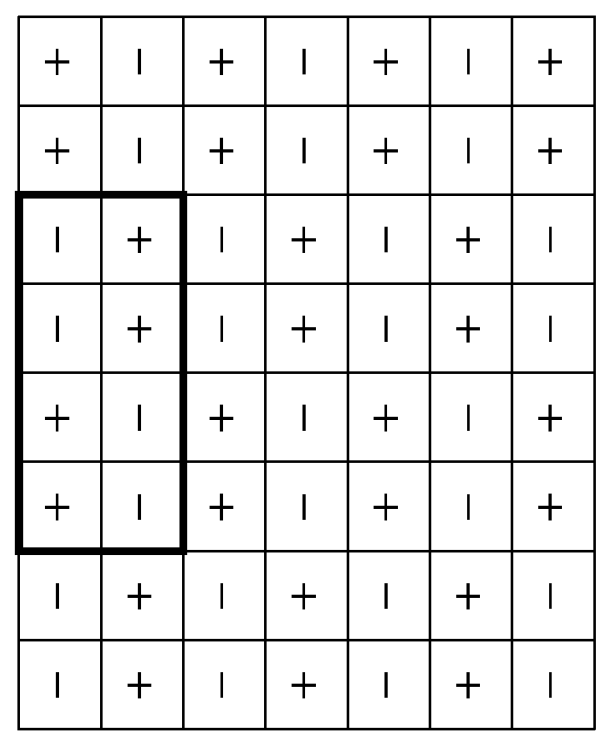

In the 2H inversion driving, for example, a data driving circuit can provide a pixel data signal 1300 for the data line 912. The pixel data signal 1300 represents a gray level of R, G or B. During the pixel data signal 1300 at a high level 1202, a scan driving circuit can provide a scanning signal 1312 for the scan line 902 to turn on the first thin film transistor 1014, so that the first storage capacitor 1012 can be charged. Then, during the pixel data signal 1300 at a low level 1203, the scan driving circuit can provide a scanning signal 1314 for the scan line 903 to turn on the second thin film transistor 1024, so that the second storage capacitor 1022 can be charged. The scanning manner for other similar pixel structures may be deduced by analogy as above embodiments and, thus, are not repeated herein. FIG. 11 shows a display result of a two dot vertical inversion (2V inversion) when the pixel array 200 of FIG. 10 is driven by the 2H inversion driving. A portion of FIG. 11 encircled by the thick frame corresponds to the pixel array of FIG. 10.

Figure 12:
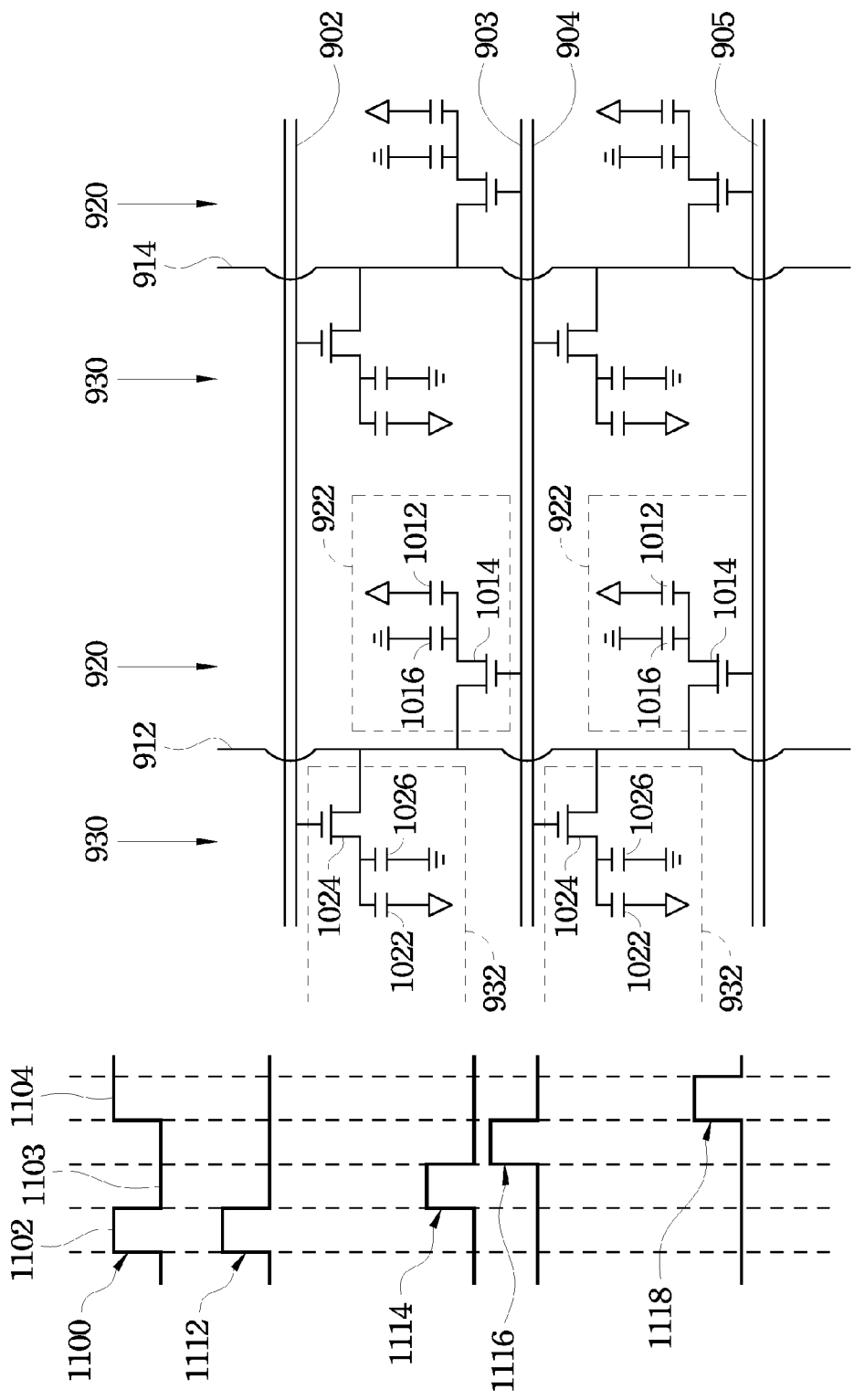
FIG. 12 is a partial circuit diagram of a pixel array of FIG. 1 with (2H+1) inversion driving according to yet another embodiment of the present disclosure.

FIG. 12 is a partial circuit diagram of a pixel array of FIG. 1 with two dot horizontal plus one (2H+1) inversion driving according to yet another embodiment of the present disclosure. In FIG. 12, the pixel array 200 is arranged as a 2G1D structure. The pixel array 200 includes a plurality of first scan lines 902 and 904, a plurality of second scan lines 903 and 905, a plurality of data lines 912 and 914, a plurality of first columns of pixel units 920 and a plurality of second columns of the pixel units 930. These lines and units are disposed on the first substrate 110 of FIG. 1.

The first scan lines 902 and 904 and the second scan lines 903 and 905 are parallel and disposed on the substrate 110 alternately. The data lines 912 and 914 are disposed on the substrate 110 and interlaced with the scan lines 902-905. The first columns of pixel units 920 are parallel and disposed on the substrate 110; the second columns of the pixel units 930 are parallel and disposed on the substrate 110. The second columns of the pixel units 930 and the first columns of the pixel units 920 are arranged alternately.

Each of the first columns of the pixel units 920 has a plurality of first pixel structures 922 arranged in a column direction and electrically connected to the second scan lines 903 and 905 and the data line 912 respectively, wherein each of the first pixel structures 922 has a first storage capacitor 1012, and the first storage capacitor 1012 has a first capacitance value. Each of the second columns of the pixel units 930 has a plurality of second pixel structures 932 arranged in the column direction and electrically connected to the first scan lines 902 and 904 and the data line 912 respectively, wherein each of the second pixel structures 932 has a second storage capacitor 1022, and the second storage capacitor 1022 has a second capacitance value.

In addition, each of the first pixel structures 922 includes a first thin film transistor 1014. The first thin film transistor 1014 is connected to the second scan lines 903 or 905, the data line 912 and the first storage capacitor 1012. Each of the second pixel structures 932 includes a second thin film transistor 1024. The second thin film transistor 1024 is connected to the first scan lines 902 or 904, the data line 912 and the second storage capacitor 1022.

Moreover, each of the first pixel structures 922 includes a first liquid crystal capacitor 1016, and the first liquid crystal capacitor 1016 is connected to the first thin film transistor 1014; each of the second pixel structures 932 includes a second liquid crystal capacitor 1026, and the second liquid crystal capacitor 1026 is connected to the second thin film transistor 1024.

Figure 13:
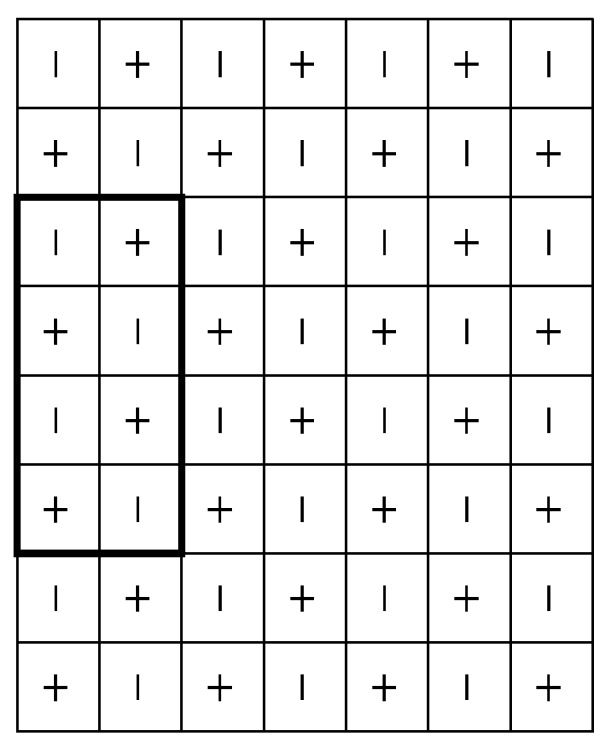

In the (2H+1) inversion driving, for example, a data driving circuit can provide a pixel data signal 1100 for the data line 912. The pixel data signal represents a gray level of R, G or B. During the pixel data signal 1100 at a high level 1102, a scan driving circuit can provide a scanning signal 1112 for the scan line 902 to turn on the corresponding second thin film transistor 1024, so that the second storage capacitor 1022 can be charged. Then, during the pixel data signal 1100 at a low level 1103, the scan driving circuit can provide a scanning signal 1114 for the scan line 903 to turn on the corresponding first thin film transistor 1014, so that the first storage capacitor 1012 can be charged. Then, during the pixel data signal 1100 at a low level 1103, the scan driving circuit can provide a scanning signal 1116 for the scan line 904 to turn on the corresponding first thin film transistor 1024, so that the second storage capacitor 1022 can be charged. During the pixel data signal 1100 at a high level 1104, a scan driving circuit can provide a scanning signal 1118 for the scan line 905 to turn on the corresponding first thin film transistor 1014, so that the first storage capacitor 1012 can be charged. The scanning manner for other similar pixel structures may be deduced by analogy as above embodiments and, thus, are not repeated herein. FIG. 13 shows a display result of a dot inversion when the pixel array of FIG. 12 is driven by the (2H+1) inversion driving. A portion of FIG. 13 encircled by the thick frame corresponds to the pixel array of FIG. 12.

In the 2H or (2H+1) inversion driving, the second capacitance value of the second storage capacitor 1022 is less than the first capacitance value of the first storage capacitor 1012, so that holding voltages of two adjacent pixels are approximately or essentially equal after a feed-through voltage drop, thereby solving the problem of the mesh lines. Preferably, the second capacitance value is 30-99.9 percentage of the first capacitance value, so that users generally cannot detect the mesh lines. More preferably, the second capacitance value is 50-95 percentage of the first capacitance value, so that the users it is hard for users to find out the mesh lines. Most preferably, the second capacitance value is 70-90 percentage of the first capacitance value, so as to eliminate the mesh lines effectively.

In view of above, the substrate 110 is combined with the pixel array 200 of FIG. 10 or FIG. 12 to serve as a liquid crystal display array substrate. The liquid crystal display array substrate includes a substrate 110, a plurality of first scan lines 902 and 904, a plurality of second scan lines 903 and 905, a plurality of data lines 912 and 914, a plurality of first columns of pixel units 920 and a plurality of second columns of the pixel units 930. The first scan lines 902 and 904 and the second scan lines 903 and 905 are parallel and disposed on the substrate 110 alternately. The data lines 912 and 914 are disposed on the substrate 110 and interlaced with the scan lines 902-905. The first columns of pixel units 920 are parallel and disposed on the substrate 110; the second columns of the pixel units 930 are parallel and disposed on the substrate 110. The second columns of the pixel units 930 and the first columns of the pixel units 920 are arranged alternately.

For the 2H inversion driving, each of the first columns of the pixel units 920 has a plurality of first pixel structures 922 arranged in a column direction and electrically connected to the first scan lines 902 and 904 and the data line 912 respectively, wherein each of the first pixel structures 922 has a first storage capacitor 1012, and the first storage capacitor 1012 has a first capacitance value. Each of the second columns of the pixel units 930 has a plurality of second pixel structures 932 arranged in the column direction and electrically connected to the second scan lines 903 and 905 and the data line 912 respectively, wherein each of the second pixel structures 932 has a second storage capacitor 1022, and the second storage capacitor 1022 has a second capacitance value, wherein the second capacitance value is less than the first capacitance value.

Alternatively, for the (2H+1) inversion driving, each of the first columns of the pixel units 920 has a plurality of first pixel structures 922 arranged in a column direction and electrically connected to the second scan lines 903 and 905 and the data line 912 respectively, wherein each of the first pixel structures 922 has a first storage capacitor 1012, and the first storage capacitor 1012 has a first capacitance value. Each of the second columns of the pixel units 930 has a plurality of second pixel structures 932 arranged in the column direction and electrically connected to the first scan lines 902 and 904 and the data line 912 respectively, wherein each of the second pixel structures 932 has a second storage capacitor 1022, and the second storage capacitor 1022 has a second capacitance value.

Accordingly, the present invention provides the second capacitance value of the second storage capacitor 1022 that is less than the first capacitance value of the first storage capacitor 1012, so that holding voltages of two adjacent pixels are approximately or essentially equal after a feed-through voltage drop, thereby solving the problem of the mesh lines.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A liquid crystal display panel comprising:
a first substrate;
a plurality of first scan lines and a plurality of second scan lines being parallel and disposed on the first substrate alternately;
a plurality of data lines disposed on the first substrate and interlaced with the scan lines;
a plurality of first columns of pixel units being parallel and disposed on to the first substrate, each of the first columns of the pixel units having a plurality of first pixel structures arranged in a column direction and electrically connected to the first scan lines and the data lines respectively, each of the first pixel structures having a first storage capacitor, and the first storage capacitor having a first capacitance value;
a plurality of second columns of pixel units being parallel and disposed on the first substrate, the second columns of the pixel units and the first columns of the pixel units being arranged alternately, each of the second columns of the pixel units having a plurality of second pixel structures arranged in the column direction and electrically connected to the second scan lines and the data lines respectively, each of the second pixel structures having a second storage capacitor, and the second storage capacitor having a second capacitance value, wherein the second capacitance value is less than the first capacitance value;
a second substrate disposed opposite to the first substrate; and
a liquid crystal layer disposed between the first substrate and the second substrate.

2. The liquid crystal display panel of claim 1, wherein each of the first pixel structures includes a first thin film transistor connected to one of the first scan lines, one of the data lines and the first storage capacitor, and each of the second pixel structures includes a second thin film transistor connected to one of the second scan lines, one of the data lines and the second storage capacitor.

3. The liquid crystal display panel of claim 1, wherein the second capacitance value is in a range of 30-99.9 percentage of the first capacitance value.

4. The liquid crystal display panel of claim 1, wherein the second capacitance value is in a range of 50-95 percentage of the first capacitance value.

5. The liquid crystal display panel of claim 1, wherein the second capacitance value is in a range of 70-90 percentage of the first capacitance value.

6. The liquid crystal display panel of claim 1, wherein an area of the second storage capacitor is smaller than an area of the first storage capacitor.

7. The liquid crystal display panel of claim 1, wherein a thickness of the second storage capacitor is greater than a thickness of the first storage capacitor.

8. The liquid crystal display panel of claim 1, wherein a dielectric constant of the second storage capacitor is less than a dielectric constant of the first storage capacitor.

9. The liquid crystal display panel of claim 1, wherein the liquid crystal to display panel is driven by 2H inversion driving, so as to achieve a display result of a 2V inversion.

10. A liquid crystal display array substrate comprising:
a substrate;
a plurality of first scan lines and a plurality of second scan lines being parallel and disposed on the substrate alternately;
a plurality of data lines disposed on the substrate and interlaced with the scan lines;
a plurality of first columns of pixel units being parallel and disposed on the substrate, each of the first columns of the pixel units having a plurality of first pixel structures arranged in a column direction and electrically connected to the first scan lines and the data lines respectively, each of the first pixel structures having a first storage capacitor, and the first storage capacitor having a first capacitance value; and
a plurality of second columns of the pixel units being parallel and disposed on the substrate, the second columns of the pixel units and the first columns of the pixel units being arranged alternately, each of the second columns of the pixel units having a plurality of second pixel structures arranged in the column direction and electrically connected to the second scan lines and the data lines respectively, each of the second pixel structures having a second storage capacitor, and the second storage capacitor has a second capacitance value, wherein the second capacitance value is less than the first capacitance value.

11. A liquid crystal display panel comprising:
a first substrate;
a plurality of first scan lines and a plurality of second scan lines being parallel and disposed on the first substrate alternately;
a plurality of data lines disposed on the first substrate and interlaced with the scan lines;
a plurality of first columns of the pixel units being parallel and disposed on the first substrate, each of the first columns of the pixel units having a plurality of first pixel structures arranged in a column direction and electrically connected to the second scan lines and the data lines respectively, each of the first pixel structures having a first storage capacitor, and the first storage capacitor having a first capacitance value;
a plurality of second columns of the pixel units being parallel and disposed on the first substrate, the second columns of the pixel units and the first columns of the pixel units being arranged alternately, each of the second columns of the pixel units having a plurality of second pixel structures arranged in the column direction and electrically connected to the first scan lines and the data lines respectively, each of the second pixel structures having a second storage capacitor, and the second storage capacitor having a second capacitance value, wherein the second capacitance value is less than the first capacitance value;
a second substrate disposed opposite to the first substrate; and
a liquid crystal layer disposed between the first substrate and the second substrate.

12. The liquid crystal display panel of claim 11, wherein each of the first pixel structures includes a first thin film transistor connected to one of the first scan lines, one of the data lines and the first storage capacitor, and each of the second pixel structures includes a second thin film transistor connected to one of the second scan lines, one of the data lines and the second storage capacitor.

13. The liquid crystal display panel of claim 11, wherein the second capacitance value is in a range of 30-99.9 percentage of the first capacitance value.

14. The liquid crystal display panel of claim 11, wherein the second capacitance value is in a range of 50-95 percentage of the first capacitance value.

15. The liquid crystal display panel of claim 11, wherein the second capacitance value is in a range of 70-90 percentage of the first capacitance value.

16. The liquid crystal display panel of claim 11, wherein an area of the second storage capacitor is smaller than an area of the first storage capacitor.

17. The liquid crystal display panel of claim 11, wherein a thickness of the second storage capacitor is greater than a thickness of the first storage to capacitor.

18. The liquid crystal display panel of claim 11, wherein a dielectric constant of the second storage capacitor is less than a dielectric constant of the first storage capacitor.

19. The liquid crystal display panel of claim 11, wherein the liquid crystal display panel is driven by (2H+1) inversion driving, so as to achieve a display result of a dot inversion.

20. A liquid crystal display array substrate comprising:
a substrate;
a plurality of first scan lines and a plurality of second scan lines being parallel and disposed on the substrate alternately;
a plurality of data lines disposed on the substrate and interlaced with the scan lines;
a plurality of first columns of the pixel units being parallel and disposed on the substrate, each of the first columns of the pixel units having a plurality of first pixel structures arranged in a column direction and electrically connected to the second scan lines and the data lines respectively, each of the first pixel structures having a first storage capacitor, and the first storage capacitor having a first capacitance value; and
a plurality of second columns of the pixel units being parallel and disposed on the substrate, the second columns of the pixel units and the first columns of the pixel units being arranged alternately, wherein each of the to second columns of the pixel units having a plurality of second pixel structures arranged in the column direction and electrically connected to the first scan lines and the data lines respectively, each of the second pixel structures having a second storage capacitor, and the second storage capacitor has a second capacitance value, wherein the second capacitance value is less than the first capacitance value.

* * * * *